United States Patent
Duckheim et al.

(10) Patent No.: US 11,376,980 B2
(45) Date of Patent: Jul. 5, 2022

(54) METHOD FOR CONTROLLING CHARGING OPERATIONS

(71) Applicant: Siemens Aktiengesellschaft, Munich (DE)

(72) Inventors: Mathias Duckheim, Erlangen (DE); Johannes Reinschke, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 300 days.

(21) Appl. No.: 15/758,400

(22) PCT Filed: Aug. 24, 2016

(86) PCT No.: PCT/EP2016/069962
§ 371 (c)(1),
(2) Date: Mar. 8, 2018

(87) PCT Pub. No.: WO2017/042032
PCT Pub. Date: Mar. 16, 2017

(65) Prior Publication Data
US 2018/0251038 A1    Sep. 6, 2018

(30) Foreign Application Priority Data
Sep. 9, 2015   (DE) ...................... 10 2015 217 213.9

(51) Int. Cl.
*H02J 7/00*       (2006.01)
*B60L 53/62*      (2019.01)
(Continued)

(52) U.S. Cl.
CPC ............... *B60L 53/62* (2019.02); *B60L 53/31* (2019.02); *B60L 53/63* (2019.02); *B60L 53/64* (2019.02);
(Continued)

(58) Field of Classification Search
CPC ...... B60L 11/1844; B60L 53/60; B60L 53/64; B60L 53/31; B60L 58/13; B60L 53/63;
(Continued)

(56) References Cited

U.S. PATENT DOCUMENTS

| | | | |
|---|---|---|---|
| 2010/0134067 A1 | 6/2010 | Baxter et al. | 320/109 |
| 2011/0221393 A1 | 1/2011 | North | 607/116 |

(Continued)

FOREIGN PATENT DOCUMENTS

| | | | |
|---|---|---|---|
| CN | 102377220 A | 3/2012 | ............. B60L 11/18 |
| CN | 102647005 A | 8/2012 | ................ H02J 7/00 |

(Continued)

OTHER PUBLICATIONS

German Search Report and Written Opinion, Application No. 102015217213.9, 7 pages, dated Oct. 5, 2015.

(Continued)

*Primary Examiner* — Zixuan Zhou
(74) *Attorney, Agent, or Firm* — Slayden Grubert Beard PLLC

(57) ABSTRACT

The present disclosure relates to charging energy stores, for example for charging electrical vehicle batteries. Various embodiments may include methods for controlling charging operations. For example a method for controlling charging operations of a plurality of electric vehicles may include: analyzing a data record including arrival times, departure times, and charging energies of the plurality of electric vehicles during a first time period; determining an upper limit for charging power based on the data record, the determined upper limit for charging power defined by an amount of power required to charge each electric vehicle between its respective arrival time and departure time; and charging the electric vehicles without exceeding the deter- (Continued)

mined upper limit for charging power during a second time period following the first time period.

7 Claims, 3 Drawing Sheets

(51) Int. Cl.
  *B60L 53/64* (2019.01)
  *B60L 53/31* (2019.01)
  *B60L 58/13* (2019.01)
  *B60L 53/63* (2019.01)
  *B60L 53/66* (2019.01)

(52) U.S. Cl.
  CPC .............. *B60L 53/66* (2019.02); *B60L 58/13* (2019.02); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01)

(58) Field of Classification Search
  CPC ... Y02T 90/121; Y02T 90/14; Y02T 10/7005; Y02T 90/163; Y02T 10/7072; Y02T 90/128; Y04S 10/126; Y02E 60/721
  USPC ............................................. 320/109; 701/22
  See application file for complete search history.

(56) References Cited

U.S. PATENT DOCUMENTS

| | | | | |
|---|---|---|---|---|
| 2011/0184587 A1* | 7/2011 | Vamos | ................... | B60L 50/16 700/297 |
| 2013/0057210 A1* | 3/2013 | Nergaard | .............. | H02J 7/0042 320/109 |
| 2013/0179061 A1* | 7/2013 | Gadh | ...................... | B60L 53/51 701/123 |
| 2013/0335033 A1* | 12/2013 | Kuribayashi | ........... | B60L 53/30 320/137 |
| 2015/0266389 A1 | 9/2015 | Appelbaum et al. | ......... | 320/138 |
| 2016/0352113 A1* | 12/2016 | Zhao | ....................... | B60L 53/35 |

FOREIGN PATENT DOCUMENTS

| | | | | |
|---|---|---|---|---|
| CN | 102655335 A | 9/2012 | ................ | H02J 7/00 |
| CN | 102918740 A | 2/2013 | ............. | B60L 11/18 |
| CN | 103683424 A | 3/2014 | ................ | H02J 7/00 |
| DE | 102013211265 A1 | 12/2014 | ............. | B60L 11/18 |
| EP | 2572925 A2 | 3/2013 | ............. | B60L 11/18 |
| WO | 2017/042032 A1 | 3/2017 | ............. | B60L 11/18 |

OTHER PUBLICATIONS

International Search Report and Written Opinion, Application No. PCT/EP2016/069962, 10 pages, dated Nov. 18, 2016.
Chinese Office Action, Application No. 201680061164.2, 7 pages, dated Aug. 4 2020.

* cited by examiner

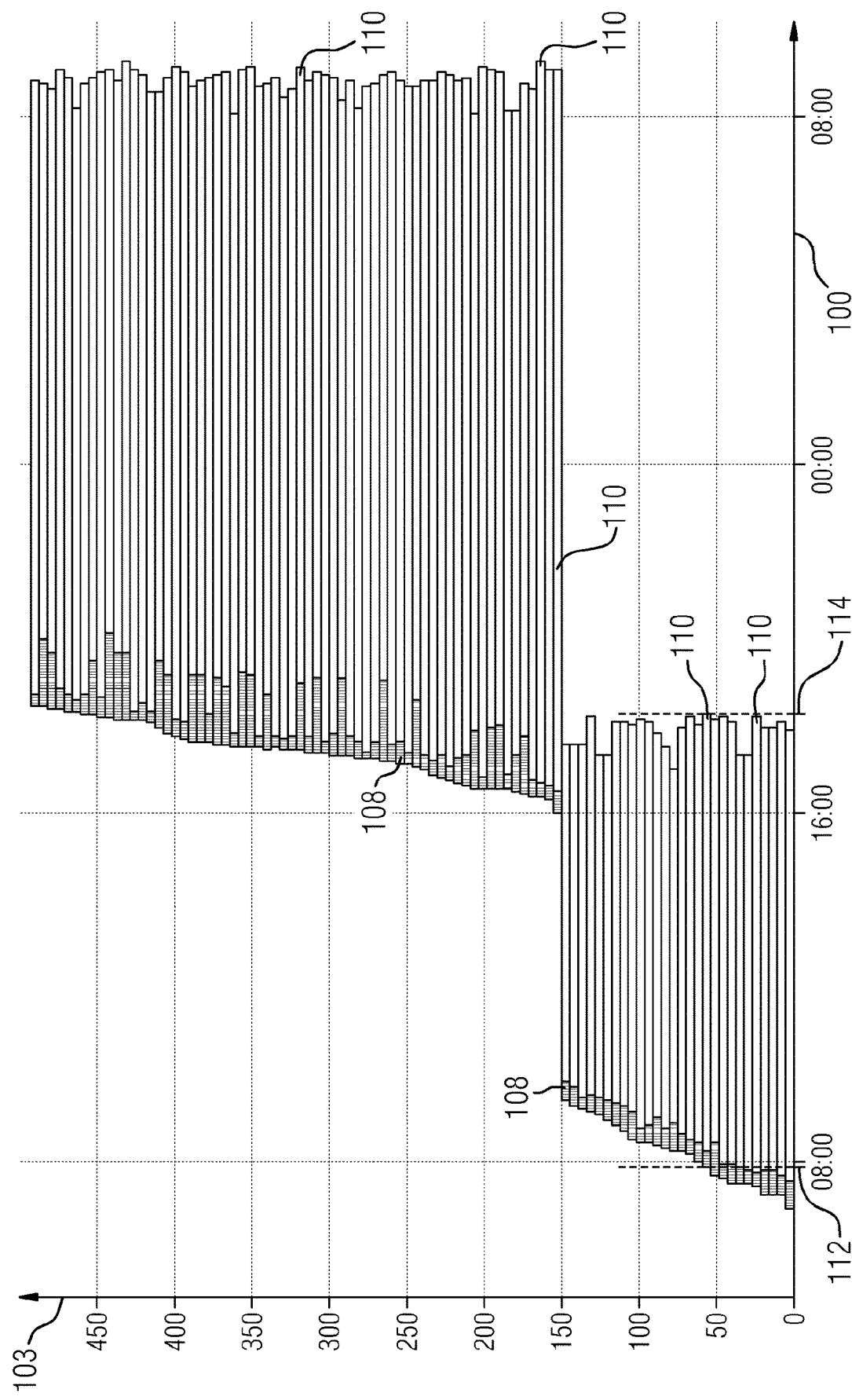

METHOD FOR CONTROLLING CHARGING OPERATIONS

CROSS-REFERENCE TO RELATED APPLICATIONS

This application is a U.S. National Stage Application of International Application No. PCT/EP2016/069962 filed Aug. 24, 2016, which designates the U.S. and claims priority to DE Application No. 10 2015 217 213.9 filed Sep. 9, 2015, the contents of which are hereby incorporated by reference in their entirety.

TECHNICAL FIELD

The present disclosure relates to charging energy stores, for example for charging electrical vehicle batteries. Various embodiments may include methods for controlling charging operations.

BACKGROUND

High power peaks can occur within a period in a charging infrastructure which makes it possible to charge a plurality of electric vehicles, which power peaks load a power supply system connected to the charging infrastructure. These voltage or power peaks are typically offset separately by an operator of the power supply system. If the charging infrastructure is assigned to a building, for example, there is typically a maximum total charging power for the building which can be discharged from the power supply system at any given instant. The maximum total charging power must not be exceeded at any time, even when the demand for charging electric vehicles may exceed the maximum total.

One difficulty here is that it is typically not known how many further electric vehicles will arrive and must be charged. The problem described above is also important, in particular, in distribution power supply systems of residential areas. This is the case since power peaks can occur, for example, as a result of the approximately simultaneous arrival of the residents of the residential area, for example in the evening, and the associated approximately simultaneous charging of their electric vehicles. According to the prior art, an attempt is made to solve the above-mentioned problem by using simple heuristics. In this case, the available charging power is distributed at any time to the electric vehicles to be charged according to a predetermined key. The above-mentioned problem could also be fully solved if future arrival times and departure times of the electric vehicles are known.

The disadvantage of the methods known according to the prior art is that, on the one hand, no cost-effective method is enabled and, on the other hand, the arrival times and departure times of the electric vehicles must be assumed to be known. However, the arrival times and departure times of the electric vehicles are typically not known in advance.

SUMMARY

The teachings of the present disclosure may include an improved method for controlling charging operations of a plurality of electric vehicles, which method avoids the above-mentioned disadvantages of the prior art, in particular. For example, a method for controlling charging operations of a plurality of electric vehicles may include: providing a data record which comprises arrival times, departure times, and charging energies of the electric vehicles during a first period; determining a upper limit for charging power (42) from the data record by means of a computing apparatus, the determined upper limit for charging power (42) making it possible to approximately completely charge each electric vehicle between its arrival time (114) and departure time (112); and charging the electric vehicles with at most the determined upper limit for charging power (42) during a second period following the first period.

In some embodiments, with regard to their charging, the electric vehicles are prioritized according to their arrival times (112) within the second period.

In some embodiments, a first day is used as the first period and a second day is used as the second period, the second day corresponding to the first day with respect to its designation.

In some embodiments, a plurality of first periods and associated data records are provided for the purpose of determining the upper limit for charging power (42), and in which a histogram which is generated from the first periods and data records and is divided into classes of first periods is used to determine the upper limit for charging power (42).

In some embodiments, the upper limit for charging power (42) is stipulated in the region between the 90% and the 98% percentile of the histogram.

In some embodiments, the electrical energy for charging the electric vehicles is provided by means of a power supply system of a building.

In some embodiments, weather data associated with the first period are taken into account when determining the upper limit for charging power (42).

BRIEF DESCRIPTION OF THE DRAWINGS

Further features and details of the teachings herein emerge from the exemplary embodiments described below and on the basis of the drawings, in which:

FIG. 3 schematically shows a further plurality of parking times and charging times of a plurality of electric vehicles according to the teachings of the present disclosure.

Identical, equivalent or identically acting elements can be provided with the same reference symbols in the figures.

DETAILED DESCRIPTION

Figure 1:
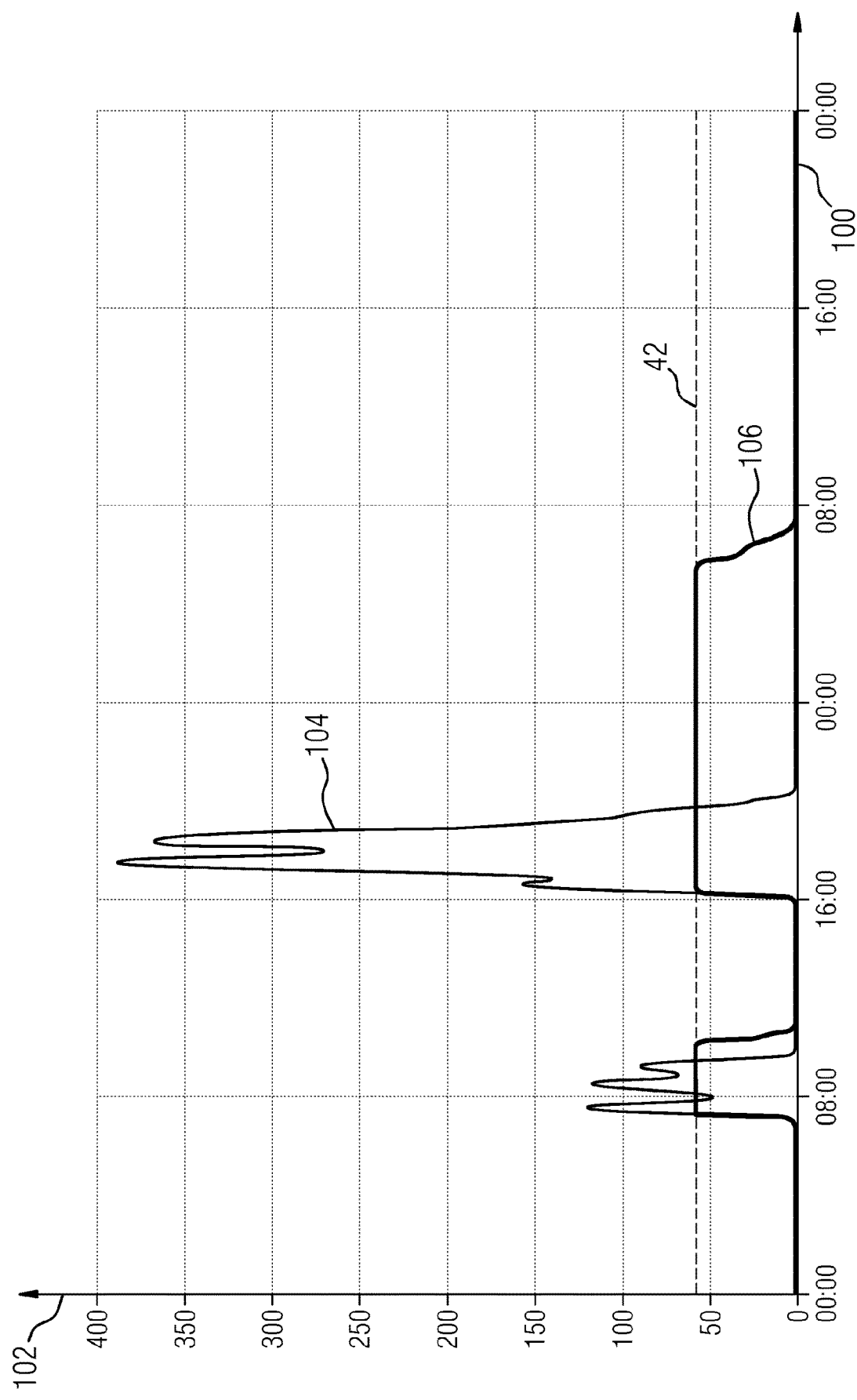
FIG. 1 schematically shows two possible charging profiles of a plurality of electric vehicles, one of the charging profiles being carried out in accordance with the method according to the teachings of the present disclosure.

An example embodiment of the teachings of the present disclosure may enable controlling charging operations of a plurality of electric vehicles. As an example, a method may comprise: providing a data record which comprises arrival times, departure times, and charging energies of the electric vehicles during a first period; determining a upper limit for charging power from the data record by means of a computing apparatus, the determined minimum total required charging power making it possible to approximately completely charge each electric vehicle between its arrival time and departure time; and charging the electric vehicles with at most the determined minimum total required charging power during a second period following the first period.

The data record for the first period may include a historical data record for the second period, by means of which an adequate prediction for the second period can be found with respect to the upper limit for charging power. Within the second period, the upper limit for charging power obtained from the data record of the first period can therefore be used as a prediction for charging the electric vehicles within the second period.

Determining the upper limit for charging power makes it possible to control the charging operations, for example by means of known heuristics, the result of which control is only slightly worse than a result which could be achieved with complete prior knowledge of all required data, that is to say the arrival times, departure times, and charging energies for all electric vehicles in the second period. The example methods may be efficiently carried out by means of software, for example on the computing apparatus. The methods described are particularly robust in comparison with known methods.

The data record which is used to determine the upper limit for charging power relates to the first period (past period) which is in the past with respect to the second period (current period). The arrival times, departure times, and charging energies of the electric vehicles in the first period are therefore known. The upper limit for charging power can be determined from these known arrival times, departure times, and charging energies by means of the computing apparatus. In this case, the upper limit for charging power is determined in such a manner that all electric vehicles can be substantially completely charged within their parking time during the first period. In this case, the parking time of an electric vehicle is determined by the temporal difference between its departure time and its arrival time.

On the one hand, the upper limit for charging power is not exceeded when charging the electric vehicles and, on the other hand, all electric vehicles are charged within their parking time. In this case, it should be noted that the individual electric vehicles are typically charged with a lower charging power which differs from the minimum necessary total charging power. The sum of the individual charging powers is finally always less than or equal to the minimum total charging power.

Furthermore, power peaks are avoided by the method descried by determining the upper limit for charging power. As a result, the load on a power supply system which provides the electrical energy for charging the electric vehicles is lower.

In some embodiments, with regard to their charging, the electric vehicles are prioritized according to their arrival times within the second period. Simple heuristics, for example an FCFS (First-Come-First-Served) method, can be used for the charging operations of the individual electric vehicles. In this case, the determined upper limit for charging power is used as the maximum total charging power for the FCFS method. A modified FCFS method, which uses knowledge of departure times and/or charging energies to prioritize the charging operations which have not yet started according to the time remaining to the departure time of one of the electric vehicles and according to the respective demand for charging energy, is also conceivable.

One advantage of the FCFS method is that the charging operation of one of the electric vehicles is started as soon as it arrives, that is to say at the arrival time of the electric vehicle. If the determined upper limit for charging power is exceeded for charging a newly arriving electric vehicle, the charging of said electric vehicle is postponed until a sufficient charging power is available, with the result that the instantaneous total charging power (sum of all individual instantaneous charging powers) always remains below the determined upper limit for charging power. If the time is subdivided into discrete time steps, the electric vehicle which has arrived waits for a subsequent time step. The electric vehicle is again treated as a newly arrived electric vehicle at the subsequent time step and a renewed check is carried out to determine whether the electric vehicle can be charged without exceeding the upper limit for charging power. If there are yet further electric vehicles whose charging operations are postponed, they are prioritized in the order of their arrival times and are possibly (sum of all charging powers less than or equal to the upper limit for charging power) admitted to the charging operation.

In some embodiments, a first day is used as the first period and a second day is used as the second period, the second day corresponding to the first day with respect to its designation. In other words, the first day (past day) constitutes a reference day on which the historical arrival times, departure times and charging energies, which form the historical data record, are captured. The second day (current day) may correspond to the first day with respect to its designation. In other words, a classification in days is carried out. For example, a historical data record is provided for a Monday outside holiday times. The second period then again corresponds to a Monday which is in the future with respect to the reference day (past Monday). In order to provide the historical data record, the arrival times, departure times, and charging energies of the electric vehicles can be recorded and captured over several years.

In other words, a plurality of first periods and associated historical data records may be provided to determine the upper limit for charging power. A histogram of the upper limit for charging powers associated with the first periods can be generated from the first periods and their associated data records. For this purpose, the first periods are divided into classes, for example according to their designation as a day of the week. A representative upper limit for charging power can be obtained from the histogram of said associated upper limit for charging powers. The upper limit for charging power may be stipulated as the representative upper limit for charging power.

An upper limit of the total charging power (associated upper limit for charging power) is therefore initially determined by means of the arrival times, departure times, and charging energies for each first period in the same class. In this case, it should be ensured that all charging operations could still have been carried out within the first period assigned to them using the determined upper limit of the total charging power. The upper limit for charging power which is representative of all first periods and corresponds to the determined upper limit for charging power can then be obtained from the histogram. For example, the upper limit for charging power may be stipulated in the region between the 90% and the 98% percentile of the histogram.

In some embodiments, the electrical energy for charging the electric vehicles is provided by means of a power supply system of a building. As a result, the electric vehicles can be charged in an immediate environment of the building, for example in a parking lot of the building. In particular, the building is a commercially used building, for example an office building, or a public building. The building may also preferably be a detached house.

In some embodiments, weather data associated with the first period are taken into account when determining the upper limit for charging power. This variation may improve the determination of the upper limit for charging power. In other words, meteorological data, for example temperatures and/or precipitation probabilities, which may affect the arrival times, departure times, and charging energies, are used to determine the upper limit for charging power. In particular, the captured first periods, in particular the captured first days, can be classified according to said meteorological data, that is to say according to their temperature and/or precipitation probability. An improved histogram and therefore an improved representative upper limit for charging power can be advantageously determined therefrom.

FIG. 1 illustrates an exemplary first and second charging profile 104, 106. The second charging profile 106 corresponds to a charging profile in accordance with the method according to the invention.

To determine a upper limit for charging power 42, arrival times, departure times, and charging energies of the plurality of electric vehicles were captured on a past day (first period). The instantaneous total charging power which is drawn from a power supply system is illustrated in kilowatt-hours on the ordinate of the graph illustrated in FIG. 1. The time of a current day (second period) is plotted on the abscissa 100 of the graph.

The first charging profile 104 corresponds to an FCFS method without a restriction of the instantaneous total charging power. In this case, each electric vehicle immediately begins its charging operation at its arrival time, to be precise with the maximum possible charging power.

It can be gathered from the illustrated graph that the FCFS method without a restriction of the instantaneous total charging power results in power peaks which—as illustrated by way of example—occur around 8 o'clock in the morning and around 5 o'clock in the evening. The teachings of the present disclosure may reduce or prevent said power peaks. For this purpose, the upper limit for charging power 42 is determined from a historical data record comprising the past arrival times, departure times, and charging energies of the electric vehicles on the past day (first day). This results in an FCFS method in which an iteration is carried out over discrete time steps, for example. In this case, the determined upper limit for charging power is stipulated in such a manner that the charging operations of the electric vehicles within the past day (first period or first day) could have been completed during their parking time. At the same time, the upper limit for charging power is stipulated to be small (minimized) such that the power peaks are reduced or do not occur. This results in an optimization problem which is sufficiently solved by the method according to the invention and the result of which is the upper limit for charging power 42. The upper limit for charging power 42 can then be used as the upper limit of the FCFS method or of a modified FCFS method. This results in the second charging profile 106 which does not have any power peaks.

Figure 2:
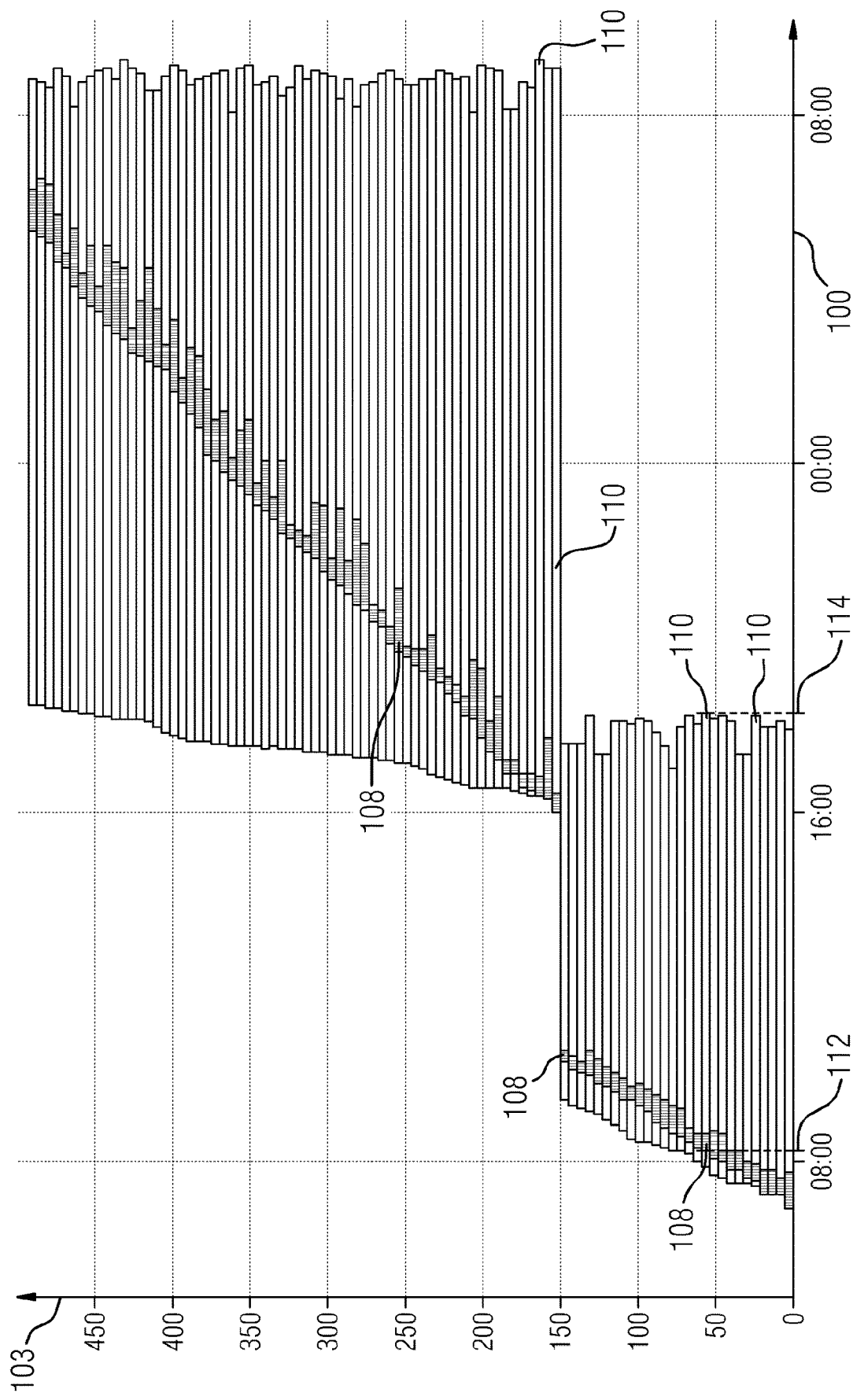
FIG. 2 schematically shows a plurality of parking times and charging times of a plurality of electric vehicles according to the teachings of the present disclosure.

FIG. 2 illustrates a plurality of parking times 110 of a plurality of electric vehicles. The number of electric vehicles is plotted on the ordinate 103 of the illustrated graph. The time of the current day (second period) is plotted on the abscissa 100 of the graph. The parking time 110 of an electric vehicle is determined by the temporal difference between its departure time 114 and its arrival time 112. In this case, the arrival time 112 and the departure time 114 of one of the electric vehicles is indicated by way of example in the graph. The parking times of the respective electric vehicles are illustrated by the horizontally extending bars 110. Charging times of the electric vehicles are indicated by the hatched horizontally extending bars 108. In the illustrated example, a portion of the electric vehicles parks during the day and another portion of the electric vehicles, which is greater than the portion parking during the day, parks at night.

In the charging profile which is illustrated in FIG. 2 and corresponds to the totality of the individual charging times 108, the determined upper limit for charging power 42 (see FIG. 1) would be exceeded as a result of the newly arriving electric vehicles, with the result that the newly arriving electric vehicles are not charged immediately at their arrival time 112. A newly arriving electric vehicle is charged at a time which is later with respect to its arrival time and at which it is ensured that the instantaneous total charging power for charging all parked electric vehicles remains below the determined upper limit for charging power. As a result, network-saving charging of the electric vehicles is provided and power peaks can be prevented.

FIG. 3 illustrates a situation which is substantially similar to FIG. 2. In contrast to FIG. 2, the instantaneous total charging power is so low here that newly arriving electric vehicles are charged immediately after their arrival, that is to say at their arrival time 112, without exceeding the upper limit for charging power. That is to say, the instantaneous total charging power which is needed to charge all parked electric vehicles at any time is always less than or equal to the determined upper limit for charging power. In other words, a charging operation of a newly arriving electric vehicle is postponed only when the charging power provided for the purpose of charging the electric vehicle, totaled with the charging powers already used by the parked electric vehicles, exceeds the determined upper limit for charging power.

Although the teachings herein have been specifically illustrated and described in detail by means of the preferred exemplary embodiments, the scope of the invention is not restricted by the disclosed examples and other variations can be derived therefrom by a person skilled in the art without departing from the scope of protection of the invention.

What is claimed is:

1. A method for controlling charging operations of a plurality of electric vehicles, the method comprising:
    analyzing a data record including arrival times, departure times, and charging energies of the plurality of electric vehicles during a first time period;
    determining an overall total charging power based on the data record, the total charging power defined by an amount of power required to charge each electric vehicle to full between its respective arrival time and departure time occurring in the first time period;
    setting an order for charging the electric vehicles based on respective departure times and the respective amount of power required; and
    charging the electric vehicles using a maximum power limit defined by the determined overall total charging power during a second time period later in time than the first time period.

2. The method as claimed in claim 1, wherein the charging power supplied to each of the plurality of electric vehicles is prioritized according to respective arrival times within the second time period.

3. The method as claimed in claim 1, wherein the first time period comprises a first day and the second time period comprises a second day corresponding to the first day with respect to a designation.

4. The method as claimed in claim 1, wherein a plurality of first time periods and associated data records are used to determine the overall total charging power; and
    further comprising generating a histogram from the plurality of first time periods and data records; and
    dividing the plurality of first time periods into classes used to determine the overall total charging power.

5. The method as claimed in claim 4, further comprising stipulating the overall total charging power in between the 90% and the 98% percentile of the histogram.

6. The method as claimed in claim 1, wherein which the electrical energy for charging the electric vehicles is provided by a power supply system of a building.

7. The method as claimed in claim 1, wherein weather data associated with the first period are taken into account when determining the overall total charging power.

* * * * *